United States Patent [19]

Lee et al.

[11] 3,979,334
[45] Sept. 7, 1976

[54] MANUFACTURE OF SPHEROIDAL ALUMINA PARTICLES

[75] Inventors: Richard K. Lee, Palatine; John C. Foley, Waukegan, both of Ill.

[73] Assignee: Universal Oil Products Company, Des Plaines, Ill.

[22] Filed: Apr. 16, 1975

[21] Appl. No.: 568,765

[52] U.S. Cl. ............................................. 252/448
[51] Int. Cl.² ........................................ B01J 37/00
[58] Field of Search...................... 252/448; 423/631

[56] References Cited
UNITED STATES PATENTS
2,620,314   12/1952   Hoekstra............................ 252/448

Primary Examiner—W. J. Shine
Attorney, Agent, or Firm—James R. Hoatson, Jr.; Robert W. Welch; William H. Page, II

[57] ABSTRACT

Spheroidal alumina particles of improved physical stability are prepared in greater yield by aging an alumina hydrosol-hexamethylene-tetramine mixture prior to dispersing the same as droplets in a hot oil bath with the formation of spheroidal hydrogel particles.

10 Claims, No Drawings

MANUFACTURE OF SPHEROIDAL ALUMINA PARTICLES

This invention relates to the manufacture of spheroidal alumina particles of macro dimension and of improved physical stability. Spheroidal alumina particles offer numerous advantages, particularly when employed as a catalyst or as a catalyst support in a fixed bed type of operation. When so employed, said particles permit a more uniform packing whereby variations in pressure drop across the bed are minimized, and the tendency of a reactant stream to channel through the bed out of effective contact with the catalyst is substantially obviated.

In many applications, the performance of the spheroidal alumina particles, either as a catalyst or as a catalyst support, is judged not only on their activity, activity stability, selectivity and selectivity stability with respect to a particular conversion process, but also on their physical stability or durability. Physical stability is of particular importance in applications where catalyst particles are subjected to vibration and general movement in a reactor or converter. Although the average particle strength may be quite acceptable, it is the disintegration of the relatively weak particles which leads to catalyst loss and the formation of fines which accumulate to plug retaining screens and effect an undue pressure drop across a catalyst bed. In addition, the disintegration of weaker particles of a tightly packed bed promotes excessive movement of the remaining particles in contact with each other resulting in further loss of catalyst through abrasion. This is of particular importance with respect to the catalytic conversion of hot exhaust gases from an internal combustion engine wherein closely packed catalyst particles are exposed to constant movement and agitation by the exhaust gases.

Spheroidal alumina particles of macro dimension are advantageously manufactured by the well-known oil-drop method substantially as described by Hoekstra in U.S. Pat. No. 2,620,314. Briefly, the method comprises commingling an acidic alumina hydrosol with a gelling agent characterized as a weak base which hydrolyzes to ammonia with increasing temperature, and dispersing the mixtures as droplets in a hot oil bath, frequently referred to as a forming oil, and generally contained in a vertical column or forming tower. The forming oil is typically a light gas oil chosen principally for its high interfacial tension with respect to water. Thus, as each droplet penetrates the oil surface, it draws into a spherical shape. The droplets are principally water at this stage and, being insoluble in the oil, they tend to assume a shape having the least surface area for its volume. A second effect is that the formed hydrosol droplets gravitating to the bottom of the forming oil are progressively gelled to a stage sufficient to maintain the structural integrity of the resulting hydrogel spheres during the subsequent processing thereof. In any case, the formed hydrogel spheres are subsequently aged, usually in the hot forming oil and thereafter washed, dried and calcined, usually in an oxidizing atmosphere at a temperature of from about 425° to about 750° C.

Spheroidal alumina particles manufactured by the described oil-drop method frequently reveal internal voids or faults under microscopic examination which portend the eventual premature disintegration of the spheres, and said voids and faults assume greater importance as the conditions to which the spheres are exposed become more severe. It is therefore an object of this invention to present an improvement in the manufacture of spheroidal alumina particles by the oil-drop method whereby spheroidal alumina particles are produced substantially free of said internal voids or faults.

Thus, in one of its broad aspects, the present invention embodies a method of manufacture which comprises commingling an acidic alumina hydrosol with an ammonia precursor at below gelation temperature and forming a mixture comprising an aluminum/acid anion ratio of from about 1:1 to about 1.5:1, said precursor being decomposable to ammonia with increasing temperature, and aging the mixture at a temperature of from about 2° to about 25° C. for a period of from about ½ to about 4 hours; dispersing the aged mixture as droplets in a hot oil bath and forming hydrogel spheres therein; aging said spheres at an elevated temperature effecting decomposition of the residual ammonia precursor contained therein; and washing, drying and calcining the aged spheres.

Other objects and embodiments of this invention will become apparent in the following detailed specification.

Pursuant to the method of this invention, an acidic alumina hydrosol is commingled with an ammonia precursor at below gelation temperature and the mixture aged for a period of from about ½ to about 4 hours before being dispersed as droplets in a hot oil bath. It is a preferred practice to add the ammonia precursor slowly to a rapidly stirred acidic alumina hydrosol at below gelation temperature. In any case, the aging process is effected while maintaining the mixture below gelation temperature — generally at a temperature of less than about 25° C. and preferably from about 15° to about 22° C.

Acidic alumina hydrosols for use herein include such as are prepared by the hydrolysis of a suitable concentration of an aluminum salt in aqueous solution at conditions to lower or reduce the acid anion concentration thereof, for example by neutralization. The olation reaction induced by the reduction in acid anion concentration yields a hydrosol comprising inorganic polymers of colloidal dimension dispersed and suspended in the aqueous media. For example, an aqueous aluminum chloride solution of suitable concentration, treated at conditions to reduce the chloride anion concentration and provide an aluminum/chloride weight ratio of from about 1:1 to about 1.5:1, will yield an acidic alumina hydrosol such as herein contemplated. The acid anion concentration is lowered or reduced by conventional methods known to the art. Thus, the acid anion concentration can be reduced by using aluminum metal as a neutralizing agent. In this case, the salt of neutralization is itself an aluminum salt subject to further hydrolysis and ultimate sol formation. In some cases, as in the case of aluminum acetate, where the acid anion is sufficiently volatile, the desired acid anion deficiency is created simply by heating. Another method of producing an acidic aluminum hydrosol is in the electrolysis of an aluminum salt solution, for example an aqueous aluminum chloride solution, in an electrolytic cell having a porous partition between the anode and the cathode whereby an acid anion deficiency is created in the cathode compartment with the formation of an alumina hydrosol therein.

Preferably, the acidic alumina hydrosol is an aluminum chloride hydrosol variously referred to as an aluminum oxychloride hydrosol, aluminum hydroxychloride hydrosol, and the like, such as is formed utilizing aluminum metal as a neutralizing agent in conjunction with an aqueous aluminum chloride solution. The aluminum chloride hydrosol is typically prepared by digesting aluminum in aqueous hydrochloric acid and/or aluminum chloride solution at about reflux temperature, usually from about 80° to about 105° C., and reducing the chloride anion concentration of the resulting aluminum chloride solution by the device of maintaining an excess of the aluminum reactant in the reaction mixture as a neutralizing agent. In any case, the aluminum chloride hydrosol is prepared to contain from about 6 to 10 weight percent aluminum in from about a 1:1 to about a 1.5:1 weight ratio with the chloride anion content thereof.

Ammonia precursors suitable for use as a setting or neutralizing agent in conjunction with the oil-drop method are described as weakly basic materials substantially stable at normal temperatures but hydrolyzable or decomposable to ammonia with increasing temperature. Typically, the ammonia precursor is hexamethylenetetramine or urea, or mixtures thereof. In any case, the ammonia precursor is utilized in an amount sufficient to effect, upon total hydrolysis, substantially complete neutralization of the chloride anion, or other acid anion, contained in the acidic hydrosol. Preferably, hexamethylenetetramine is utilized, and in an amount equivalent to from about a 1:4 to about a 1.25:4 mole ratio with the acid anion content of the acidic hydrosol. The hexamethylenetetramine is generally prepared as a 28 to 40 wt. % aqueous solution thereof and, as such, commingled with the acidic hydrosol at below gelation temperature.

As heretofore stated, the acidic alumina hydrosol is commingled with the ammonia precursor at below gelation temperature and the mixture aged for a period of from about 1 to about 4 hours before being dispersed as droplets in a hot oil bath. Apart from this novel aging procedure, whereby spheroidal alumina particles are unexpectedly produced in improved yield, the method of this invention is substantially as described in U.S. Pat. No. 2,620,314. Thus, the aged mixture is dispersed as droplets in a hot oil bath preferably maintained at a temperature of from about 50° to about 105° C. Only a fraction of the ammonia precursor is hydrolyzed or decomposed to ammonia in the relatively brief period during which sufficient gelation occurs to form stable spheroidal hydrogel particles. During the subsequent aging process, the residual ammonia precursor retained in the spherical hydrogel particles continues to hydrolyze and effect further polymerization of the alumina whereby the pore characteristics of the product are established. The spherical gel particles are aged, preferably in the alkaline oil bath, at a temperature of from about 50° to about 260° C. and at a pressure to maintain the water content of said particles in a substantially liquid phase. Preferably, the gel particles are aged at a temperature of from about 50° to about 160° C. and at a pressure of from about 40 to about 150 psig whereby the water content of the particles is maintained in a substantially liquid phase. The spheroidal particles are suitably aged at the described conditions of temperature and pressure within a period of from about 1 to about 5 hours.

After the aging treatment, the spheres are washed in any suitable manner. A particularly satisfactory method is to wash the spheres by percolation, either with an upward or downward flow of water, and preferably with water containing a small amount of ammonium hydroxide and/or ammonium nitrate. After washing, the spheres may be dried at a temperature of from about 95° to about 315° C. for 2 to 24 hours or more, or dried at this temperature and calcined at a temperature of from about 425° to about 760° C. for 2 to 12 hours or more, and utilized as such or composited with other catalytic components. It is preferred that the spheres be dried slowly and also that the drying be effected in a humid atmosphere since it has been found to result in less breakage of the spheres.

The described oil-drop method affords a convenient means of developing the desired density characteristics of the spherical gel product. Thus, the method includes a number of process variables which effect the physical properties of the spherical alumina particles. Generally, the aluminum/chloride ratio of the hydrosol will influence the average bulk density of the particles and, correspondingly, the pore volume and pore diameter characteristics attendant therewith, higher ratios tending toward lower average bulk densities. Low density alumina spheres, i.e. less than about 0.5 grams per cubic centimeter, are produced with aluminum/chloride ratios of from about 1.0 to about 1.5. Other process variables effecting physical properties include time, temperature and pH at which the particles are aged. Surface area properties are normally a function of calcination temperature.

Spheroidal alumina particles prepared according to the method of this invention are particularly useful as a high surface area support or carrier material to impart added physical stability and durability to a catalytic composite at the extreme conditions encountered in the treatment of hot exhaust gases emanating from an internal combustion engine. Catalytic components useful in the treatment of said exhaust gases include the metals and the oxides of metals of Group IB, Group VIB and VIII of the Periodic Table for example, chromium, molybdenum, tungsten, iron, nickel, cobalt, platinum, palladium, rhodium, ruthenium, osmium, iridium, copper, etc., as well as the oxides thereof, and said components are readily composited with the spheroidal alumina particles by conventional impregnation and/or ion-exchange techniques.

In the treatment of hot exhaust gases from an internal combustion engine, catalytic composites comprising the spheroidal alumina particles of this invention are advantageously disposed in a fixed bed of a converter installed in the exhaust manifold and hence are directly exposed to the buffeting effect of the hot exhaust gases. The spheroidal particles exhibit improved physical stability to withstand said buffeting while impeding the direct flow of the gases without an undue pressure drop across the bed. The effect is a pseudo-turbulent flow more conducive to the conversion of the noxious components of the hot exhaust gases.

The following examples are presented in illustration of the method of this invention and are not intended as an undue limitation on the generally broad scope of the invention as set out in the appended claims.

EXAMPLE I

The improvement resulting from the practice of this invention is particularly evident when utilizing an alumina sol-hexamethylenetetramine mixture which has not had sufficient or adequate mixing. Thus, a 30.5 wt. % aqueous hexamethylenetetramine solution was added rapidly to an aluminum chloride hydrosol and the mixture hand stirred for only 2 minutes. The hydrosol contained 13.7 wt. % aluminum in a 1.24:1 weight ratio with the chloride anion content thereof, and the aqueous hexamethylenetetramine solution was used in sufficient quantity to effect, upon total hydrolysis, 116% neutralization of said chloride anions. After the brief mixing period, the mixture was dispersed as droplets in a vertical column of gas oil maintained at about 98° C. The spheroidal hydrosol particles recovered from the bottom of the column were transferred to a separate vessel and aged for 2.3 hours at 60 psig in gas oil maintained at 145° C. The aged spheres were then washed for 3.5 hours in a flow of water at 95° C., utilizing 6 gallons of water per pound of spheres. The water effluent had a pH of 9.0. The washed spheres were dried for 1 hour at 120° C., then at 175° C. for 1 hour, and finally at 230° C. for 1 hour. The dried spheres were subsequently processed through a three-zoned calcining oven and progressively calcined in air at 205° C., 535° C., and 675° C., calcination at each temperature being for a 1-hour period. The spheroidal product is hereinafter referred to as Product A.

EXAMPLE II

Spheroidal alumina particles were prepared substantially as described in Example I except that the hydrosol-hexamethylenetetramine mixture was aged for 1 hour at 18° C. with light stirring. The aged mixture was thereafter dispersed as droplets in the hot gas oil and further treated in the described manner. The spherical product is hereinafter referred to as Product B.

EXAMPLE III

In this example, spheroidal alumina particles were prepared substantially as described in Example I except that the hydrosol-hexamethylenetetramine mixture was aged for 1 hour at 21° C. with light stirring. The aged mixture was thereafter dispersed as droplets in the hot gas oil and further treated in the described manner. The spherical product is hereinafter referred to as Product C.

Each of the products were screened for the separation of broken and oversize spheres to determine total product yield. In each case, a representative sample of the total product yield was soaked in alphachloronaphthalene to lend transparency to the spheres whereby any voids were readily detectable under microscopic examination. The results are set out in Table I below.

TABLE I

| Product | A | B | C |
|---|---|---|---|
| Total yield | 85.8 | 99.7 | 99.9 |
| Defective | 32.0 | 14.0 | 1.0 |

TABLE I-continued

| Product | A | B | C |
|---|---|---|---|
| Defect-Free Yield | 58.3 | 85.7 | 98.9 |

It is apparent that, even with a poorly mixed sol-hexamethylenetetramine mixture, the method of this invention is effective to increase the defect-free product yield, dramatically so in the case of Product C which represents a preferred embodiment of this invention.

We claim as our invention:
1. A method of manufacturing spheroidal alumina particles which comprises:
   a. commingling an acidic alumina hydrosol with an ammonia precursor at below gelation temperature and forming a mixture comprising from about 6 to 10 wt. % aluminum and from about 1:1 to about 1.5:1 weight ratio of aluminum to the acid anion content thereof, said precursor being hydrolyzable to ammonia with increasing temperature, and aging the mixture with stirring at a temperature of from 2° to about 25°C. for a period of from about 1 to about 4 hours;
   b. dispersing the aged mixture as droplets in a hot oil bath and forming hydrogel spheres therein;
   c. aging said spheres at an elevated temperature effecting decomposition of the residual ammonia precursor contained therein; and
   d. washing, drying and calcining the aged spheres.
2. The method of claim 1 further characterized with respect to step (a) in that said ammonia precursor is hexamethylenetetramine.
3. The method of claim 1 further characterized with respect to step (a) in that said mixture is aged at a temperature of from about 15° to about 22° C.
4. The method of claim 1 further characterized with respect to step (a) in that said ammonia precursor is utilized in an amount to effect substantially complete neutralization of the acid anion content of said mixture upon total hydrolysis.
5. The method of claim 2 further characterized with respect to step (a) in that said hexamethylenetetramine is utilized in from about a 1:4 to about 1.25:4 mole ratio with said acid anion.
6. The method of claim 1 further characterized with respect to step (b) in that said oil bath is maintained at a temperature of from about 50° to about 105° C.
7. The method of claim 1 further characterized with respect to step (c) in that said spheres are aged at a temperature of from about 50° to about 105° C.
8. The method of claim 1 further characterized with respect to step (c) in that said spheres are aged at a temperature of from about 50° to about 260° C. and at a pressure to maintain the water content thereof in a substantially liquid phase.
9. The method of claim 1 further characterized with respect to step (c) in that said spheres are aged at a temperature of from about 50° to about 160° C. and at a pressure of from about 40 to about 150 psig.
10. The method of claim 1 further characterized with respect to step (d) in that said spheres are calcined at a temperature of from about 425° to about 760° C.

* * * * *